United States Patent [19]
Ellsworth et al.

[11] 4,021,840
[45] May 3, 1977

[54] SEAM TRACKING WELDING SYSTEM

[75] Inventors: Archibald B. Ellsworth, Santee; Douglas W. Mayberry, El Cajon; William A. Roden, Rancho Santa Fe; Cleveland E. Roye, Spring Valley, all of Calif.

[73] Assignee: General Dynamics Corporation, San Diego, Calif.

[22] Filed: Jan. 24, 1975

[21] Appl. No.: 543,715

[52] U.S. Cl. .............................. 358/101; 353/100; 353/125; 219/125 PL; 219/124

[51] Int. Cl.² .......................................... H04N 7/18

[58] Field of Search ...... 219/125 PL, 124, 121 EM; 178/DIG. 21, DIG. 37, 6.8; 359/100, 101; 358/125

[56] References Cited
UNITED STATES PATENTS

| | | | |
|---|---|---|---|
| 3,426,174 | 2/1969 | Graham | 219/121 EM |
| 3,532,807 | 10/1970 | Webb | 178/6 |
| 3,609,288 | 9/1971 | Sciaky | 219/124 |
| 3,775,581 | 11/1973 | Sciaky | 219/125 PL |

Primary Examiner—Robert L. Richardson
Assistant Examiner—Edward L. Coles

Attorney, Agent, or Firm—John R. Duncan

[57] ABSTRACT

A welding system in which a welder automatically tracks the seam to be welded. This is an automatic servo-driven tracking system employing a raster-scan television camera as an optical sensor. The camera is aimed at the seam area in advance of a cross-slide mounted welding head with the line scan substantially perpendicular to the seam. The camera produces a voltage pulse which exactly coincides with the point in time at which the line scan intercepts the seam. The time incidence pulse is referenced to the standard synchronization pulse (the initiation of the line scan) of the camera. The video signal line which contains these pulses is fed to a novel video anomaly detector. The detector processes this information and produces an output voltage which is analogous to the position of the seam. This output is directed to a master/slave position servo drive system which maintains the welding torch over the seam as the seam moves past the welding station. The image produced by the television camera may be displayed on a conventional television screen together with a line indicative of welding torch position for visual observation of system operation.

5 Claims, 3 Drawing Figures

SEAM TRACKING WELDING SYSTEM

BACKGROUND OF THE INVENTION

This invention relates in general to continuous seam welders and, more specifically, to a system for accurate tracking of a seam during sink welding.

A number of different systems have been developed for guiding a welding torch along a desired path relative to a workpiece during welding. The most simple arrangements merely move the welder or workpiece along a preselected path. These arrangements tend to be relatively inaccurate, since the moving mechanism will generally not exactly follow the ideal path. Moving very large workpieces past a welding station without deviating from the intended path is very difficult. Also, these systems do not provide for irregularities in workpiece size or shape.

Because of these problems, a number of seam tracking systems have been developed. Many use a mechanical servo arrangement in which a sensor or feeler rides along the seam ahead of the welding head. However, these do not provide precisely accurate tracking because of mechanical backlash and the need to have the sensor sufficiently far ahead of the welder to avoid interference with the welding operation. The greater the separation between sensor and welder, the greater the chance for error resulting from seam irregularities between the two locations. Also, mechanical systems are only usable with joints having gaps large enough to receive the sensing means.

In an attempt to provide tracking of seams in structures of widely varying shapes, U.S. Pat. No. 3,575,364 provides a flexible track secured to the structure adjacent to the seam. while this system has a variety of applications, its accuracy is limited by the accuracy of track placement.

Attempts have been made to use electronic sensing and control of seam welders. For example, the system disclosed in U.S. Pat. No. 3,532,807 uses a television camera guided servo system. However, this system used television scanning parallel to the weld seam, resulting in an unstable video signal making detection unreliable, especially with curved structures or seams. Also, the use of a closed loop servo system requires both torch and camera be mounted on a single carriage, with attendant problems of magnetic interference to the camera, vibration transmission to the camera and carriage size.

Thus, there is a continuing need for an improved seam tracking system for welders.

SUMMARY OF THE INVENTION

It is, therefore, an object of this invention to provide a welding system overcoming the above-noted problems.

Another object of this invention is to provide a seam-tracking welding system of improved accuracy.

A further object of this invention is to provide a seam-tracking welding system of improved simplicity and reliability.

Yet another object of this invention is to provide a convenient arrangement for observing the operation of a seam-tracking welding system.

The above objects, and others, are accomplished in accordance with this invention by an automatic servo-driven welding head tracking system employing a television camera as an optical sensor. A conventional line-scan television camera is aimed at a small area along a seam to be welded with the line-scan oriented substantially perpendicular to the seam. The area should be near the torch, even including the point of welding. The camera senses the seam as a line of finite width which is normally much darker (or, in some instances, much lighter) than the surrounding material. The camera produces a negative voltage pulse which exactly coincides with the point in time at which the line-scan intercepts the seam. Through appropriate electronic circuitry, the time incidence of the seam pulse is referenced to the standard horizontal synchronization pulse (the initiation of the line-scan) of the camera. The video signal line which contains these pulses is fed to combination of a video anomaly detector and an anomaly position-to-analog voltage converter. The voltage of the resulting converter output signal is a linear function of the elapsed time between synchronization pulse and seam pulse. Since the elapsed time between these pulses corresponds to the position of the seam, this converter output voltage is analogous to this position.

This signal then drives a master-slave position servo drive. The output voltage signal is fed to means for adjusting the welding torch position, which may be a motor driven cross-slide upon which the welding torch is mounted. The cross-slide is connected to a linear displacement transducer which produces a voltage proportional to its position. The motor excitation current is a function of this voltage minus the converter output voltage, so that the cross-slide is driven to a position where the two voltages are equal. The position of the welding torch is, therefore, analogous to the converter output voltage, which in turn is analogous to the position of the weld seam. The system thus maintains the welding torch directly over the weld seam at all times during the welding operation.

BRIEF DESCRIPTION OF THE DRAWING

Details of the invention, and of a preferred embodiment of the invention, will be further understood upon reference to the drawing, wherein.

DETAILED DESCRIPTION OF THE INVENTION

Figure 1:
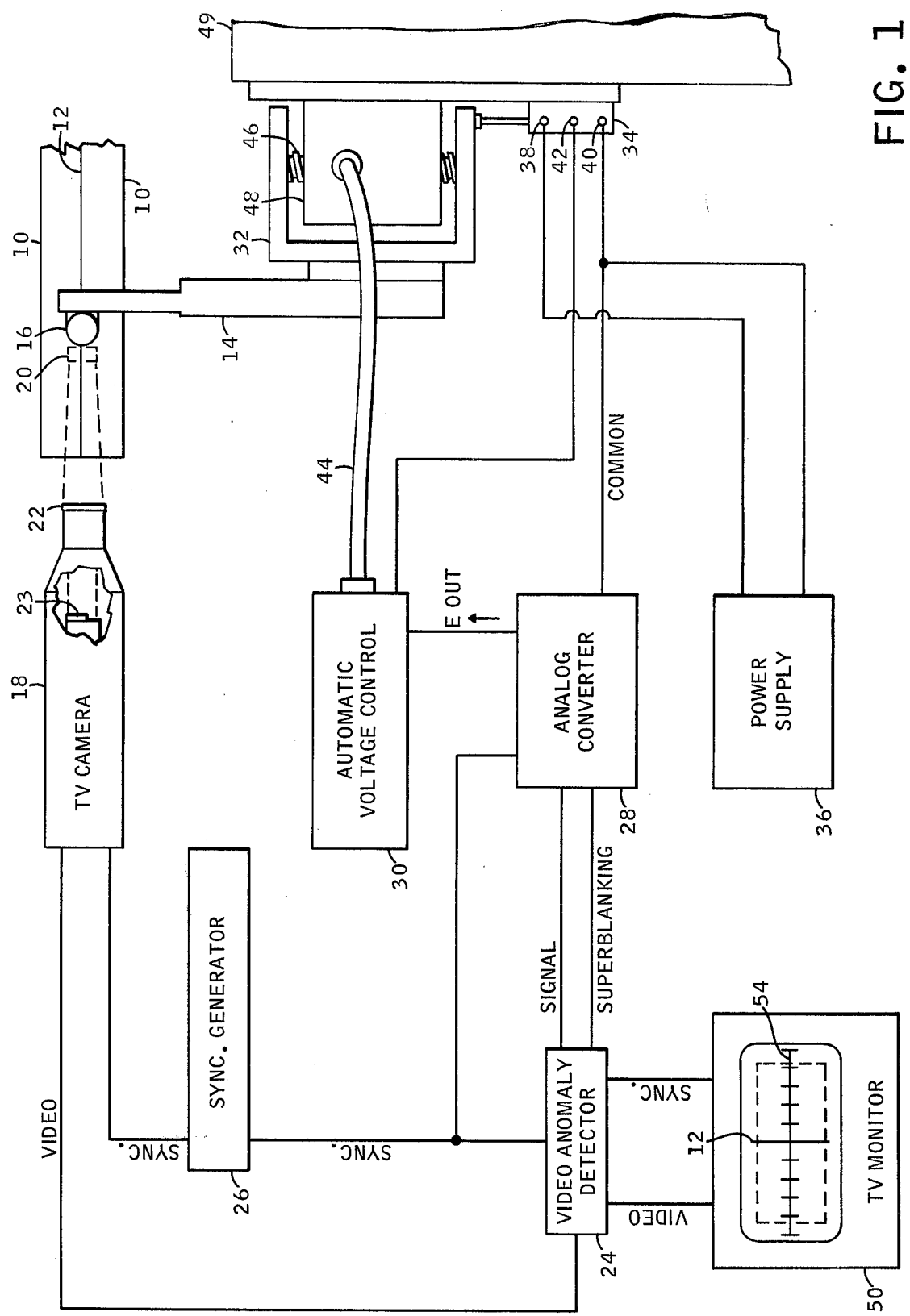
FIG. 1 is a schematic block diagram of the seam tracking welding system of this invention.

Referring to FIG. 1, there is seen a schematic diagram of the system of this invention.

A pair of workpieces 10 are arranged with a seam 12 therebetween to be welded. A suitable fixture (not shown) supports workpieces 10 for movement relative to a welding head 14 carrying a welding torch 16. Workpiece 10 may be moved in a direction generally parallel to seam 12, or welding head 14 may be mounted for movement along stationary seam 12, as desired. Any suitable welding torch may be used, including flame, arc, electron beam and other welders.

A closed circuit television camera 18 of the conventional raster-scan type is aimed at an area around seam 12 just ahead of, and preferably slightly overlapping, the point of welding along seam 12. The area viewed by TV camera 18 is indicated by broken lines around area 20. Preferably, a full field filter 22 is placed in front of the lens of camera 18. Filter 22 is a bandpass filter passing only visible light and is oriented so that radiation reaching the lens from the point of welding (or weld puddle) passes through the filter which screens out infra red and ultraviolet radiation, while visible light reflected from workpiece 10 in area 20 is unfiltered. This serves to prevent overloading of the camera vidicon tube. Preferably, a partial field filter 23 is incorporated in camera 18 to further reduce light intensity in the portion of the field containing the welding arc. Typical TV cameras which are useful in this application are the Cohu 2820-011, and the Packard Bell PB-911.

The video signal generated by camera 18 passes to a video detector 24, typically a CVI-630 from Colorado Video Inc. A synchronization pulse from sync generator 26 typically a Cohu 2740-400 also passes to video detector 24. Synchronization generator 26 includes a crystal controlled oscillator and interlock controls to improve accuracy and stability of scanning.

Video detector 24 receives all video information contained in, or produced from, the field of view. It can be adjusted in a conventional manner to ignore or bypass all except the video pulses contained in a desired area, i.e., the clean area designated 20 containing the weld seam. The video detector also rejects video pulses of the opposite polarity and pulses of insufficient amplitude (from smudges, scratches, etc.).

The video signal and a superblanking signal from video detector 24 then pass to an anomaly position-to-analog voltage converter 28. Converter 28 converts the elapsed time from scan initiation (a sync pulse from sync generator 26) to weld seam incidence (the video pulse) to a direct current voltage. Typically, as further detailed in FIG. 2, this is done by starting a constant rate of rise voltage ramp (an integrated circuit integrator) with the sync pulse, and then stopping the voltage rise (by terminating the input to the integrator) with the video pulse. The maximum voltage reached is thereby a linear function of the elapsed time between pulses.

The output voltage from Converter 28 is directed to an automatic voltage control 30 typically a Celesco 22 or Dimetrics 1005N, which controls motor driven cross-slide 32 and simultaneously to terminal 40 of linear displacement transducer 34. Typically transducer 34 may be a resistor with a 32 volt range and 16 volt center point. Power supply 36 may typically supply about 32 volts to terminals 38 and 40 of transducer 34. Transducer 34 thus produces a voltage proportional to its position, which passes from terminal 42 to control 30. The motor excitation current, which passes through cable 44 to a motor which drives screw 46 from within housing 48 mounted on fixture 49, is a function of the voltage from terminal 42 of transducer 34 minus the voltage from converter 28, which may typically be set to vary ± 5 volts D.C. The motor is thus operated to drive screw 46, moving cross-slide 32 until the voltage from transducer 34 equals the converter output voltage. The position of torch 16 is therefore, analogous to the output voltage of converter 28, which in turn is analogous to the position of weld seam 12. Thus, as the position of seam 12 varies during welding, the position of the welding head will vary correspondingly.

During welding, system operation may be visually monitored on a television monitor 50, typically a Conrac SNA-17R television monitor. Seam 12 will show up as a dark line against a light rectangle 52 corresponding to area 20. A scale 54 can be calibrated in converter 28 output voltage swing, typically ± 5 VDC, or in inches of seam excursion, since these are analogous in this system.

Figure 2:
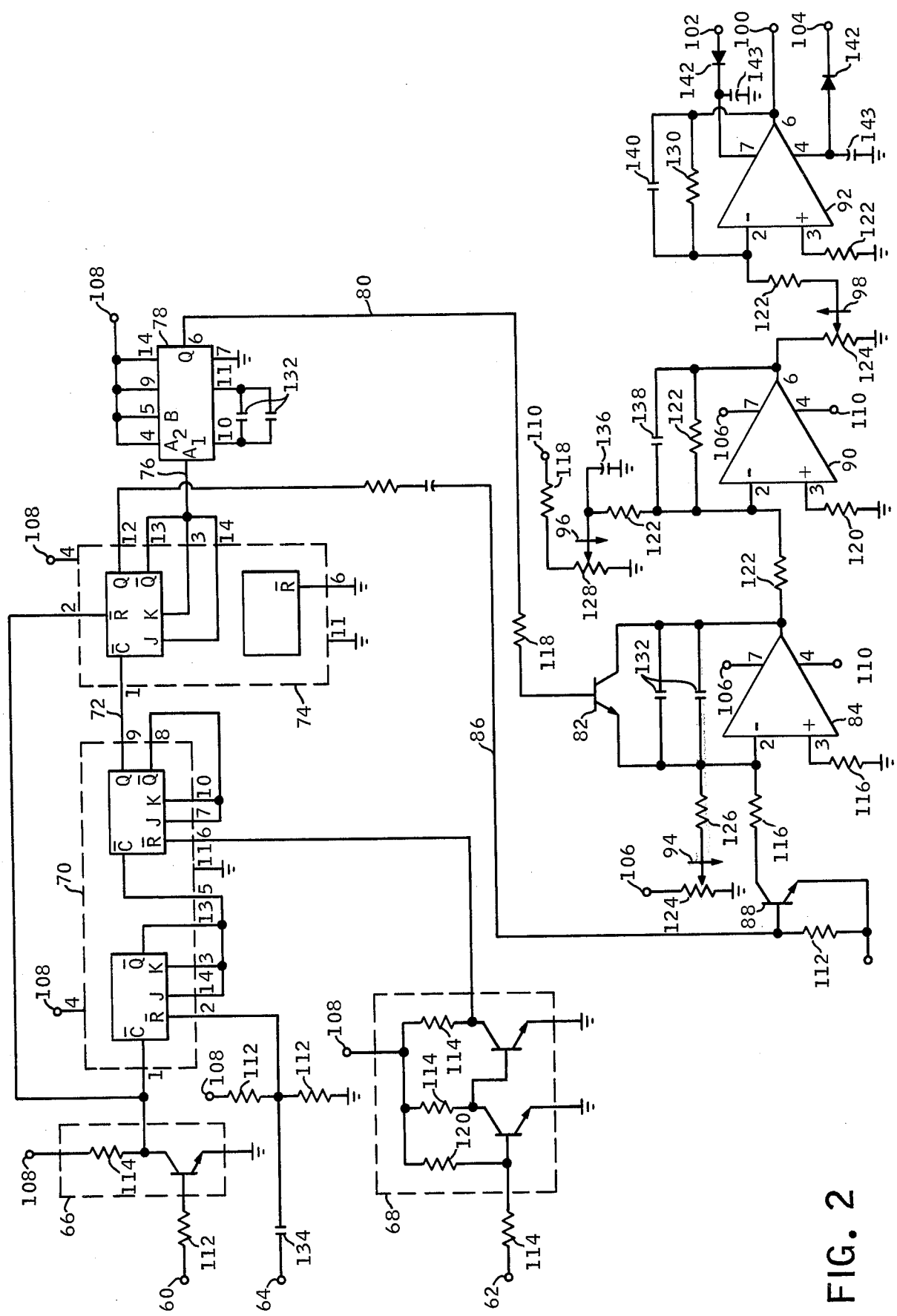
FIG. 2 is a schematic circuit diagram of a preferred anomaly position-to-analog voltage converter.

A preferred circuit for anomaly position-to-analog voltage converter 28 is schematically shown in FIG. 2.

The output signal from video detector 24 enters the analog converter 28 circuit at terminal 60, with the signal from sync generator 26 entering at terminal 62 and the superblanking signal entering at terminal 64. The signals from terminals 60 and 62 pass through transistor amplifiers (comprising 2N2369A transistors from RCA or Motorola) 66 and 68, respectively, to integrated circuit 70 which may be a 7473 flip-flop, available from Fairchild Semiconductor. The three signals are processed by the integrated circuit to produce output voltage pulses in line 72 which start with the sync pulse of the first scan-line falling in the superblanked area. The signal in line 72, together with the video detector signal from terminal 60 is directed to a second 7473 flip-flop 74 which provides two alternating contact voltage outputs (lines 76 and 86) initiating with initiation of input pulses on lines 72 and 60, respectively. Flip-flop output line 76 is connected to integrated circuit 78, typically an A74121 one-shot multivibrator available from Fairchild Semiconductor, to provide an output pulse of finite width in line 80.

The output signal from one-shot multivibrator 78 passes through line 80 to transistor amplifier 82 (typically, a 2N2369A NPN transistor), which saturates and discharges capacitor 132, resetting integrator 84 (typically a LM318H operational amplifier). Similarly, a signal from flip-flop 74 passes through line 86 and transistor 88 (typically, another 2N2369A) to integrator 84, where a constant voltage ramp is generated. The output signal from the integrator 84 then has a D.C. voltage level proportional to the time of integration, which passes through two amplifiers 90 and 92 (each of which may be a 741CG operational amplifier) where it is filtered (smoothed out) and amplified for subsequent use.

A variable potentiometer 94 is provided for drift control adjustment. Other potentiometers 96 and 98 are provided for adjustment of offset and gain, respectively.

The output signal of the analog converter 28 thus appears at output terminal 100, from which it passes to automatic voltage control 30, as seen in FIG. 1. Positive and negative unregulated voltages are imposed on terminals 102 and 104, respectively, from the power supply to furnish power for the operational amplifier 92.

Power from power supply 36 is applied to a number of terminals shown in FIG. 2, with +6 volts imposed on terminals 106, +5 volts at terminals 108, and −6 volts at terminals 110.

A number of capacitors and resistors are included in this diagram of a preferred circuit. As is well known, the values of these components may be varied within suitable limits. Typical values include: resistors 112, 4.7 K ohms; resistors 114, 2.2 K ohms; resistors 116, 47 K ohms; resistors 118, 47 O ohms; resistors 120, 3.3 K ohms; resistors 122, 10 K ohms; resistors 124, 5 K ohms; resistor 126, 10 megohms; resistor 128, 1,000 ohms; resistor 130, 56 K ohms; capacitors 132, 1000 pF; capacitors 134, 0.001 μF; capacitors 136, 1 μF; capacitors 138, 10 μF; and capacitors 140, 30 μF. Other isolation capacitors between various lines and ground may be used, where desired. A pair of blocking diodes 142 (typically, 1N 4001 silicon diodes) and capacitor 143 are used adjacent to terminals 102 and 104 to minimize effects of voltage fluctuations (from the power supply) on the amplifier 92.

Figure 3:
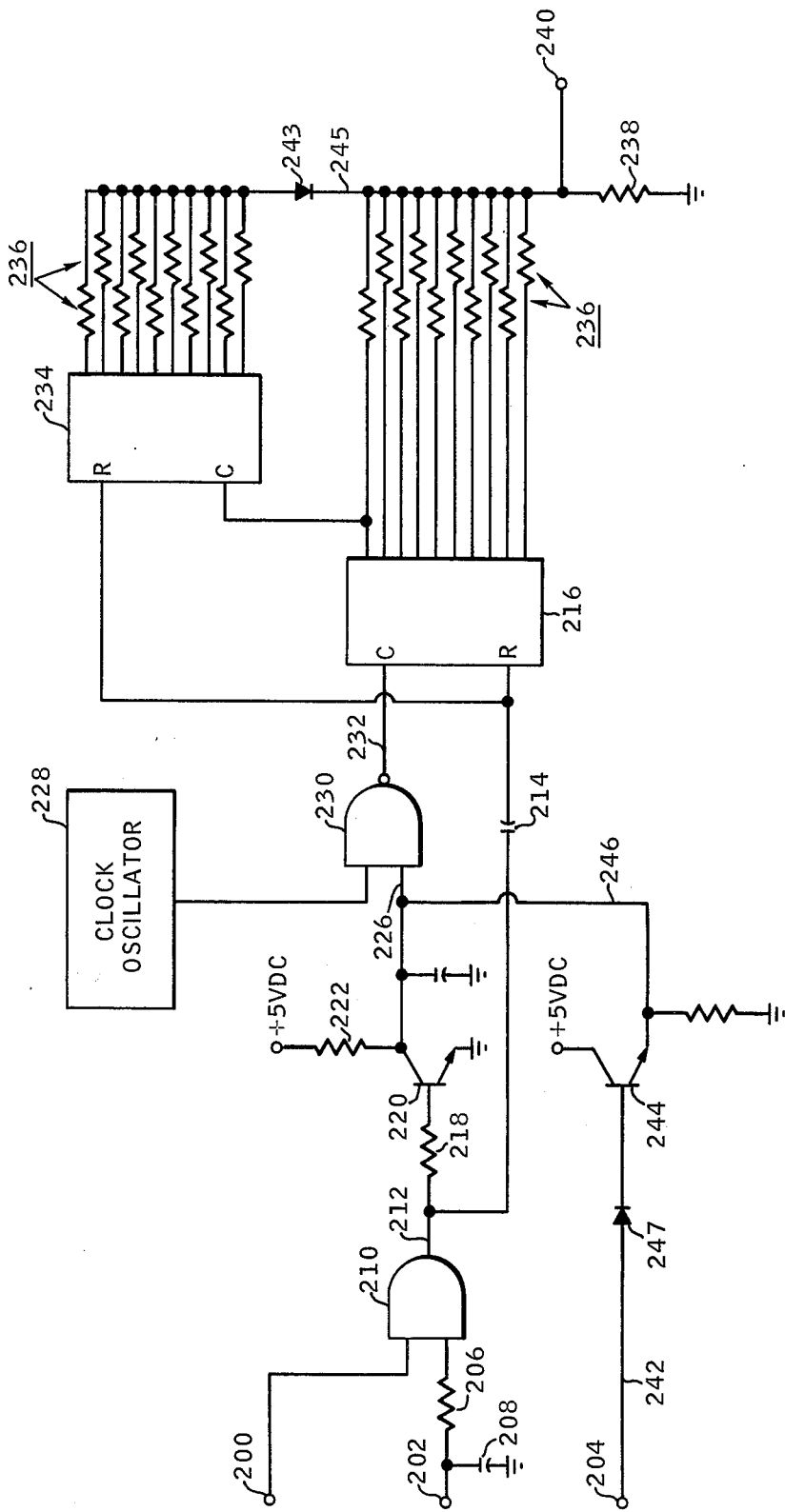
FIG. 3 is a schematic circuit diagram of an alternative anomaly position-to-analog voltage converter.

An alternative embodiment of the anomaly position-to-analog voltage converter shown in FIG. 2 is schematically illustrated in FIG. 3. As in the circuit of FIG. 2, this alternative circuit provides an output voltage analogous to the length of time between the sync pulse (initiation of scan) and the pulse generated at the weld seam. The sync signal enters at terminal 200, the superblanking signal at terminal 202 and the video seam pulse signal at terminal 204.

Sync and superblanking signals from terminals 200 and 202, respectively, enter resistor 206 and capacitor 208, then AND gate 210, a conventional 7408 AND gate. The output (line 212) is a voltage pulse which starts with the sync pulse following a superblanking pulse.

The pulse in line 212 goes through capacitor 214, which reduces its duration to reset the decode counter 216 (a conventional 9360 D.C.) from Fairchild Semiconductor to zero. The pulse in line 212 also goes to resistor 218 for current limiting and transistor switch 220 (an NPN transistor) which converts the pulse to a logic low pulse of increased duration. The duration, determined by resistor 222 and capacitor 224, is preferably approximately equal to 1½ television sweep lines. This pulse (in line 226), along with a train of timing pulses from clock oscillator 228 (typically on about 1.5 MHz Torotel No. 7070DO5E free running clock oscillator) enter NAND gate 230 (a conventional 7400 NAND gate) which outputs the timing pulses as long as the signal in line 226 is low. The gated timing pulses (line 232) then enter decode counter 216 where the pulse is sequentially stepped along the 10 outputs. As the tenth successive pulse is reached, it is sent to second decode counter 234 (another 9360 D.C.) which then steps off its outputs in a like manner. All the outputs of both counters are confined by resistor network 236. The resistance value of each resistor in network 236 varies, increasing in the order of output step level. Since these resistors and resistor 238 form a voltage divider, the voltage which appears at output terminal 240 is analogous to the numerical outputs of the counters (counter 234 is tens and counter 216 is units). A transistor diode 243, acting as a blocking diode and a rectifier in line 245 acts to prevent signals from counter 216 passing through line 245 to counter 234 and blocks any negative pulses from counter 234. The count is stopped when the pulse train on line 232 is terminated. This is done by the weld seam pulse on line 242. A transistor diode 247, acts as a blocking diode to prevent any negative pulses entering from terminal 204, so that only positive pulses pass to transistor 244. NPN transistor 244 produces a logic high voltage pulse on line 226 (via line 246) which charges capacitor 224 gating off the NAND gate 230 until the next sync and superblanking cycle. This terminates the pulses on line 232 so that the counters outputs and the output voltage at terminal 240 is held until the next cycle. Thus, the output voltage at terminal 240 is analogous to the length of time between the sync pulse (start of scan) and the weld seam pulse.

Although specific arrangements, components and proportions have been described in the above description of a preferred embodiment, other arrangements, circuit sub-combinations and components may be used, where suitable, with similar results.

Other modifications, applications and ramifications of the present invention will become apparent to those skilled in the art upon reading the present disclosure. These are intended to be included within the scope of this invention as defined in the appended claims.

We claim:

1. An automatic seam-tracking welding system comprising:
   a welding means positioned adjacent to a point along a seam in a workpiece to be welded;
   carriage means to move said welding means and workpiece seam relative to each other with said welding means remaining generally aligned with said seam during welding;
   a television camera of the raster-scan type mounted independently of said carriage means and aimed at an area adjacent to and slightly overlapping said point;
   said camera positioned so that the direction of said scan is substantially perpendicular to said seam;
   means to produce a time incidence voltage pulse coinciding with the point in time at which said scan intercepts said seam;
   video signal means to reference the time incidence pulse to a standard synchronization pulse occurring at the initiation of line scan;
   video anomaly detector means to process the output of said video signal means and produce an output voltage analogous to the position of said seam;
   servo means controlled by said signal to move said welding head to a position analogous with said output voltage signal;
   whereby said welding means is maintained over and aligned with said seam during welding.

2. The system according to claim 1 further including a television screen for monitoring the image produced in said camera.

3. The system according to claim 1 wherein said servo means comprises a cross-slide upon which said welding means is mounted, and means to drive said cross-slide to move said welding means back-and-forth along a line substantially perpendicular to said seam.

4. In a seam welding system comprising a welding head mounted adjacent to a point along a workpiece seam to be welded, carriage means to provide relative movement between the workpiece and welding head with said head remaining approximately over said seam, a television camera aimed at an area around said point and servo means controlled by said camera to maintain said head in alignment with said seam during welding, the improvement wherein said television camera is of the raster-scan type supported independently of said carriage means and is oriented so that said scan is substantially perpendicular to said seam, said camera is adapted to produce a time incidence pulse coinciding with the point in time at which said scan intercepts said seam; and said servo system includes electronic circuit means to produce a voltage signal of a level analogous to the time between scan initiation and said voltage pulse and automatic voltage control means to balance said voltage level against a pre-selected voltage and move said head to a position analogous to said voltage level whereby scanning and welding may be conducted simultaneously.

5. The improvement according to claim 4 wherein said servo system further includes a cross-slide upon which said welding head is mounted, and means to drive said cross-slide for moving said welding head along a line substantially perpendicular to said seam without moving said television camera.

* * * * *